(12) United States Patent
Kumar et al.

(10) Patent No.: US 11,375,416 B2
(45) Date of Patent: Jun. 28, 2022

(54) METHOD AND USER EQUIPMENT APPARATUS FOR OPTIMIZING RADIO RESOURCE FOR URLLC SERVICES IN DUAL CONNECTIVITY TECHNOLOGY

(71) Applicant: SAMSUNG ELECTRONICS CO., LTD., Suwon-si (KR)

(72) Inventors: Sunil Kumar, Bengaluru (IN); Naveen Kumar, Bengaluru (IN); Karthikeyan Subramaniam, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 16/887,739

(22) Filed: May 29, 2020

(65) Prior Publication Data
US 2020/0389824 A1    Dec. 10, 2020

(30) Foreign Application Priority Data

May 31, 2019    (IN) .............................. 201941021736
May 22, 2020    (IN) .............................. 201941021736

(51) Int. Cl.
*H04W 4/00*        (2018.01)
*H04W 36/00*      (2009.01)

(52) U.S. Cl.
CPC .............................. *H04W 36/0069* (2018.08)

(58) Field of Classification Search
CPC ............. H04W 28/0263; H04W 28/08; H04W 28/0804; H04W 28/0819; H04W 36/0069; H04W 72/1263
See application file for complete search history.

(56) References Cited

U.S. PATENT DOCUMENTS

| 8,605,674 B2 | 12/2013 | Park et al. |
| 9,768,933 B2 | 9/2017 | Hwang |
| 2017/0331577 A1 | 11/2017 | Parkvall et al. |

(Continued)

FOREIGN PATENT DOCUMENTS

WO    2018/022225 A1    2/2018

OTHER PUBLICATIONS

Anonymous "Study on NR Industrial Internet of Things (IoT)" Nokia, Nokia Shanghai Bell, 3GPP TSG RAN meeting #81, Gold Coast, Australia, Sep. 10-13, 2018, RP-182090, (5 pages total).

(Continued)

*Primary Examiner* — Matthew W Genack
(74) *Attorney, Agent, or Firm* — Sughrue Mion, PLLC (57) ABSTRACT

Provided is a method for optimizing radio resource for Ultra-Reliable Low Latency Communication services in a Dual Connectivity technology. The method includes: receiving DownLink (DL) data by a UE using a first Radio Access Technology (RAT) from a base station; transmitting a first Acknowledgement (ACK) signal using the first RAT to the base station based on the DL data being successfully received; updating a Mapping Table Sequence Number of the DL data in a Mapping Table by the UE, based on the DL data being successfully received by the UE using the first RAT; checking the Mapping Table by the UE upon detecting an error in the received DL data using a second RAT; and sending a second ACK signal to the base station using the second RAT of the UE based on the Mapping Table Sequence Number of the DL data being found in the Mapping Table.

18 Claims, 8 Drawing Sheets

(56) References Cited

U.S. PATENT DOCUMENTS

2019/0058550 A1    2/2019  Kim

OTHER PUBLICATIONS

Qualcomm Incorporated "PDCP Duplication Enhancements for URLLC traffic" R2-1904669, 3GPP TSG RAN WG2 Meeting #105bis, Mar. 29, 2019 (6 pages total).
Samsung "Resource efficient PDCP duplication operation" R2-1904925, 3GPP TSG-RAN WG2 Meeting #105bis, Mar. 29, 2019, (5 pages total).
Qualcomm Incorporated "Summary of Enhancements to Scheduling/HARQ" R1-1905833, 3GPP TSG-RAN WG1 Meeting #96b, Apr. 8-12, 2019, (27 pages total).
International Search Report (PCT/ISA/210), issued by International Searching Authority in corresponding International Application No. PCT/KR2020/007037, dated Sep. 3, 2020.
Communication dated Nov. 8, 2021, issued by the INDIA Intellectual Property Office in Indian Patent English Application No. 201941021736.
Communication dated Apr. 28, 2022, issued by European Patent Office in counterpart European Patent Application No. 20812627.6.
Adnan Aijaz: "Packet Duplication in Dual Connectivity Enabled 5G Wireless Networks: Overview and Challenges", arxiv.org, Cornell University Library, dated Apr. 3, 2018.

Sequence number to CBG mapping Table

| User ID | PDCP SN | RLC SN | HARQ Process ID | CBG Number | ACK Received flag by other RAT |
|---|---|---|---|---|---|
| X | 10 | 11 | 2 | 1 | NO |
| X | 11 | 12 | 3 | 2 | YES |
| X | 12 | 13 | 4 | 3 | YES |
| X | 13 | 14 | 5 | 4 | NO |
| | | | | | |
| | | | | | |
| | | | | | |
| | | | | | |

METHOD AND USER EQUIPMENT APPARATUS FOR OPTIMIZING RADIO RESOURCE FOR URLLC SERVICES IN DUAL CONNECTIVITY TECHNOLOGY

CROSS-REFERENCE TO RELATED APPLICATION(S)

This application is based on and claims priority under 35 U.S.C. § 119(a) to Indian Provisional Patent Application No. 201941021736, filed on May 31, 2019, and Indian Patent Application No. 201941021736, filed on May 22, 2020, in the Indian Intellectual Property Office. The disclosures of the above-named applications are incorporated by reference herein in their entireties.

BACKGROUND

1. Field

The disclosure relates to the field of telecommunication, particularly, but not exclusively, to a method and a user equipment (UE) for optimizing radio resource when Packet Data Convergence Protocol (PDCP) duplication feature is enabled for Ultra-Reliable Low Latency Communication (URLLC) services in a Dual Connectivity (DC) technology.

2. Description of Related Art

The 5G New Radio (NR) introduces a concept of duplication and split bearer at the PDCP. The duplication is just like sending one packet multiple times over different carriers to increase the reliability. If the data packet is sent over multiple carriers, then there is a chance that at least one of the copies of the packet will be received successfully by the UE. However, there are a few drawbacks to it. For example, the increase in overhead as each duplicate packet will double the overhead and lower the spectrum efficiency. Further, if the packet is sent over two carriers, then each carrier will consider it as a separate packet for itself. For instance, consider that the UE receives the packet successfully over carrier 2 but fails to receive it over carrier 1. This will initiate Hybrid Automatic Repeat Request (HARQ) retransmissions over carrier 1 even though the packet has already been received by the UE. This is because the UE was not able to decode the packet over carrier 1. As a result, the next generation Node B (gNB) (also, referred as a base station) will keep retransmitting the packet and keep consuming more resources.

The PDCP duplication process is performed as follows. When submitting a PDCP Packet Data Unit (PDU) to a lower layer, if the transmitting PDCP entity is associated with one Radio Link Control (RLC) entity then the transmitting PDCP entity shall submit the PDCP PDU to the associated RLC entity. Similarly, if the transmitting PDCP entity is associated with two RLC entities and the PDCP duplication process is activated and also the PDCP PDU is a PDCP data PDU, then duplicate the PDCP data PDU and transmit the PDCP data PDU to both RLC entities. Similarly, if the PDCP PDU is a PDCP control PDU, then submit the PDCP control PDU to the primary RLC entity. Further, activating or deactivating of PDCP duplication for the PDCP entity is configured with the PDCP duplication.

In order to discard duplicate PDU for the entity configured with PDCP duplication, the transmitting PDCP entity may if the successful delivery of a PDCP data PDU is confirmed by one of the two associated Acknowledge Mode (AM) RLC entities, then indicates to the other AM RLC entity to discard the duplicate PDCP data PDU. Similarly, if the deactivation of PDCP duplication is indicated, then all duplicated PDCP data PDUs in the secondary RLC entity is discarded. Using Downlink (DL) user data frame, RLC entity may come to know which PDCP Sequence Number (SN) needs to be discarded by the RLC. A frame format for the NR has been introduced in User Plane protocol (NR-UP) specification. This frame format is defined to allow the corresponding node to detect lost NR-U packets and is associated with the transfer of a downlink NR PDCP PDU. Therefore, there is a need for optimizing radio resources when PDCP duplication feature is enabled for URLLC services.

The information disclosed in this background of the disclosure section is for enhancement of understanding of the general background of the invention and should not be taken as an acknowledgement or any form of suggestion that this information forms the prior art already known to a person skilled in the art.

SUMMARY

In accordance with an aspect of the disclosure, there is provided a method optimizing radio resource for URLLC services in a DC technology. The method includes receiving DL data by a UE using a first Radio Access Technology (RAT) from a base station, transmitting a first Acknowledgement (ACK) signal using the first RAT to the base station when the DL data is successfully received, updating a Mapping Table Sequence Number of the DL data in a Mapping Table by the UE when the DL data is successfully received by the UE using the first RAT, checking the Mapping Table by the UE on detecting an error in receiving the DL data using a second RAT, and sending a second ACK signal to the base station using the second RAT of the UE when the Mapping Table Sequence Number of the DL data is found in the Mapping Table.

In accordance with an aspect of the disclosure, there is provided a UE for optimizing radio resource for URLLC services in a DC technology. The UE may include a processor, and a memory communicatively coupled to the processor, wherein the memory stores processor-executable instructions, which on execution, cause the processor to receive DL data by a UE using a first RAT from a base station, transmit a first ACK signal using the first RAT to the base station when the DL data is successfully received, update a Mapping Table Sequence Number of the DL data in a Mapping Table by the UE when the DL data is successfully received by the UE using the first RAT, check the Mapping Table by the UE on detecting an error in receiving the DL data using a second RAT and send a second ACK signal to the base station using the second RAT of the UE when the Mapping Table Sequence Number of the DL data is found in the Mapping Table.

In accordance with an aspect of the disclosure, there is provided a method optimizing PDCP duplication in a Multi-RAT UE. The method includes receiving, by the UE, a plurality of data packets onto a first RAT, detecting, by the UE, an error in receiving the data packets on the first RAT, checking, by the UE, whether at least one data packet has been received into a second RAT, and sending, by the UE, a message on the first RAT indicating that the plurality of data packets has been received if at least one data packet has been received on the second RAT.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
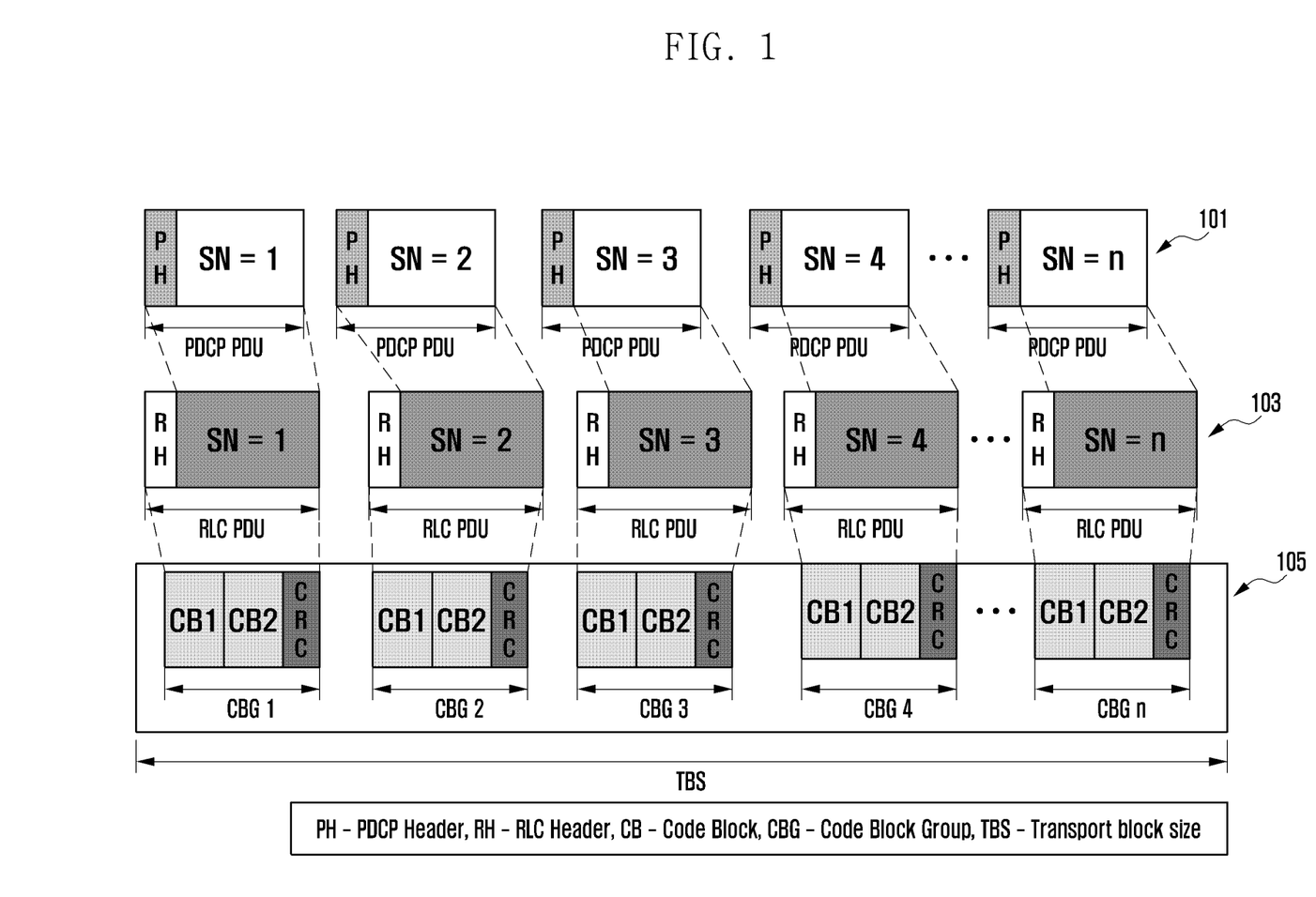
FIG. 1 illustrates Code Block Group (CBG) based transmission according to an embodiment.

FIG. 1 illustrates CBG based transmission according to an embodiment.

With reference to FIG. 1, when PDCP duplication and split bearer duplication feature is enabled at base station then base station may perform PDU transmission based on CBG. The base station may maintain PDCP sequence number to CBG mapping table during making of Transport Block (TB), which may be sent along with DL data to the UE, e.g., UE apparatus. The PDCP sequence number to CBG mapping table may be referred as Mapping Table. The base station may form 1 to n CBGs 105 from 1 to n RLC PDUs 103, which may be formed from 1 to n PDCP PDUs 101, and transmit CBGs in a TB to a UE.

Figure 2:
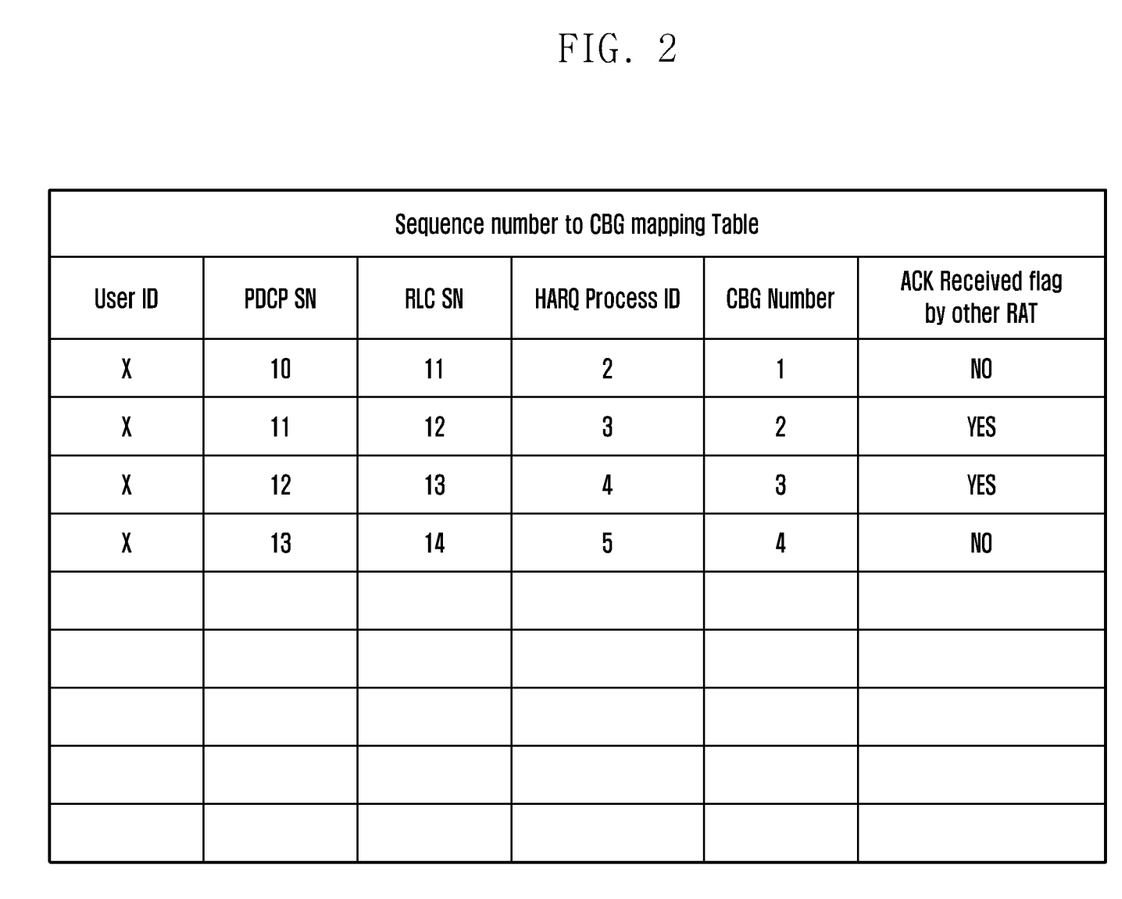
FIG. 2 shows PDCP sequence number to CBG mapping table according to an embodiment.

FIG. 2 shows PDCP sequence number to CBG mapping table according to an embodiment.

The UE maintains the PDCP sequence number to CBG mapping table internally. The PDCP sequence number to CBG mapping table may be referred as Mapping Table. The table includes user identifier (user id), PDCP Sequence Number (SN), RLC SN, HARQ process id, CBG number and ACK received flag. The Mapping Table may include a mapping between CBG and PDCP sequence number, or between TB and PDCP sequence number, or between PDCP and PDCP sequence number, or between CBG and CBG sequence number, or between TB and TB sequence number. The table, as shown in FIG. 2, is maintained and updated by the UE when DL data is received by the UE from a base station. The Mapping Table may reside at MAC layer or RLC layer or PDCP layer in the UE. In an embodiment, the Mapping Table may reside in Service Data Adaptation Protocol (SDAP) layer by creating a shared memory space for use by stacks associated with the multiple RATs. In an embodiment, the Mapping Table may reside in the network, i.e., at a base station. In an embodiment, the Mapping Table may be maintained by the network at one of Network Functions virtualized over a cloud platform and a function part of a Service-Based Architecture. For instance, when LTE RAT of UE receives DL data from a base station and successfully processes the DL data, the LTE RAT of the UE may send ACK signal to the base station. At the same, the LTE RAT may update the PDCP sequence number to CBG mapping table for received DL data. The PDCP sequence number may be referred as Mapping Table Sequence Number. In the next operation, the LTE RAT of the UE may internally inform NR RAT of the UE with the received DL data. More precisely, the NR RLC of the UE may inform NR MAC of the UE of the received DL data. Subsequently, the NR MAC may update "ACK received flag from other RAT" in the table to TRUE. When the NR MAC of the UE is not successfully able to decode the received DL data or finds error in the received DL data, the NR MAC may perform following action:

If "ACK received flag from other RAT" in the table is TRUE, i.e., the DL data has been successfully received by the other RAT then the NR MAC of the UE may send ACK instead of sending Negative ACK (NACK) to the base station. In this situation, no retransmission of DL data is required as the other RAT has successfully received and processed the DL data.

If "ACK received flag from other RAT" in the table is FALSE, i.e., the DL data has not been successfully received by the other RAT then the NR MAC of the UE may send NACK to the base station as normal flow. In this situation, retransmission of DL data is required as the other RAT has not successfully received and processed the DL data.

In an embodiment, when the PDCP duplication and split bearer duplication feature is enabled to receive the DL data in a CBG format then the Mapping Table has a column for CBG Number. In an embodiment, when the PDCP duplication and split bearer duplication feature is enabled to receive the DL data in a TB format then the Mapping Table has a column for TB Number.

Figure 3A:
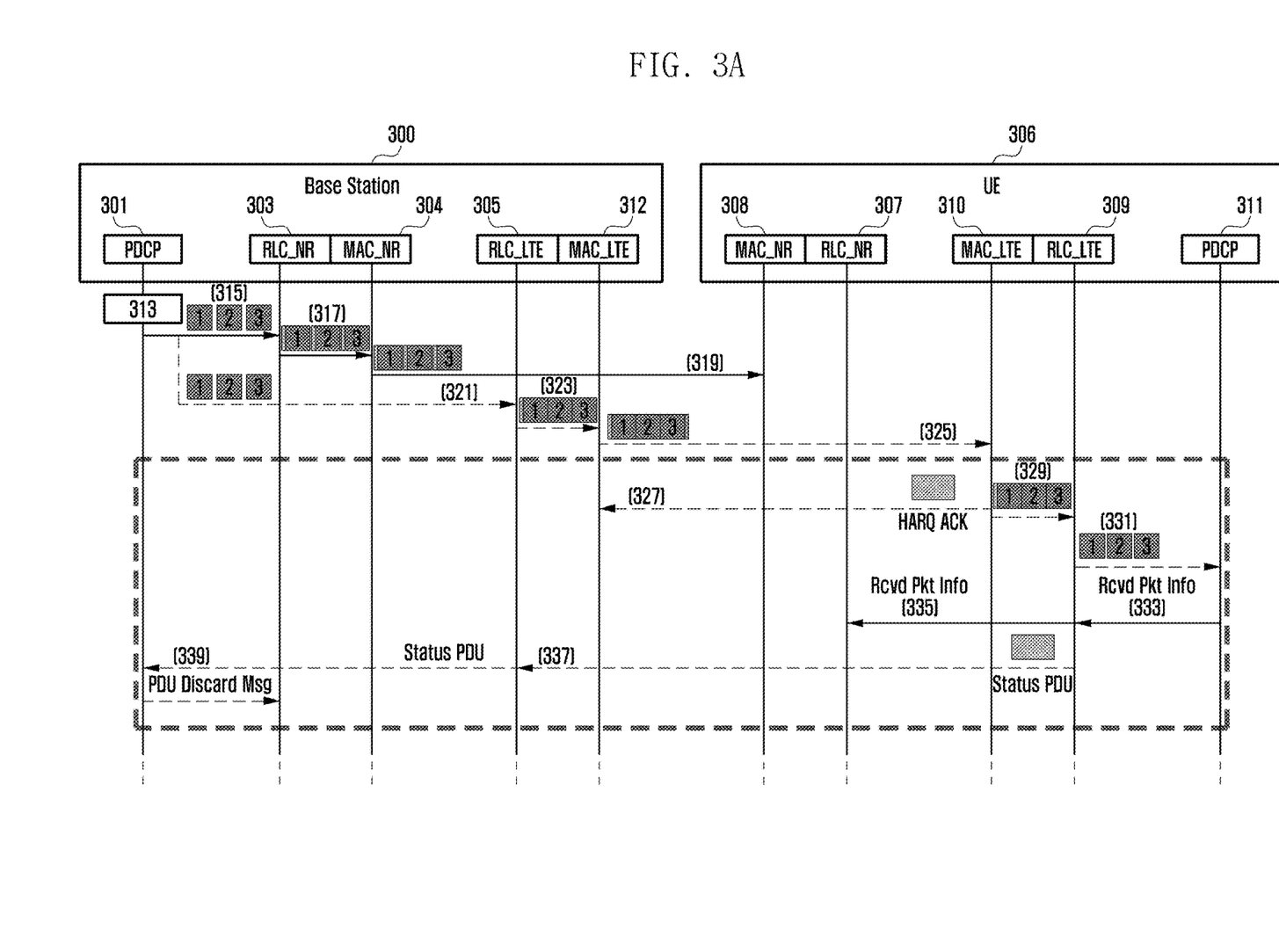
FIG. 3A illustrates a timing diagram in which UE internally informs received packet information to RLC and Medium Access Control (MAC) layers of NR according to an embodiment.
Figure 3B:
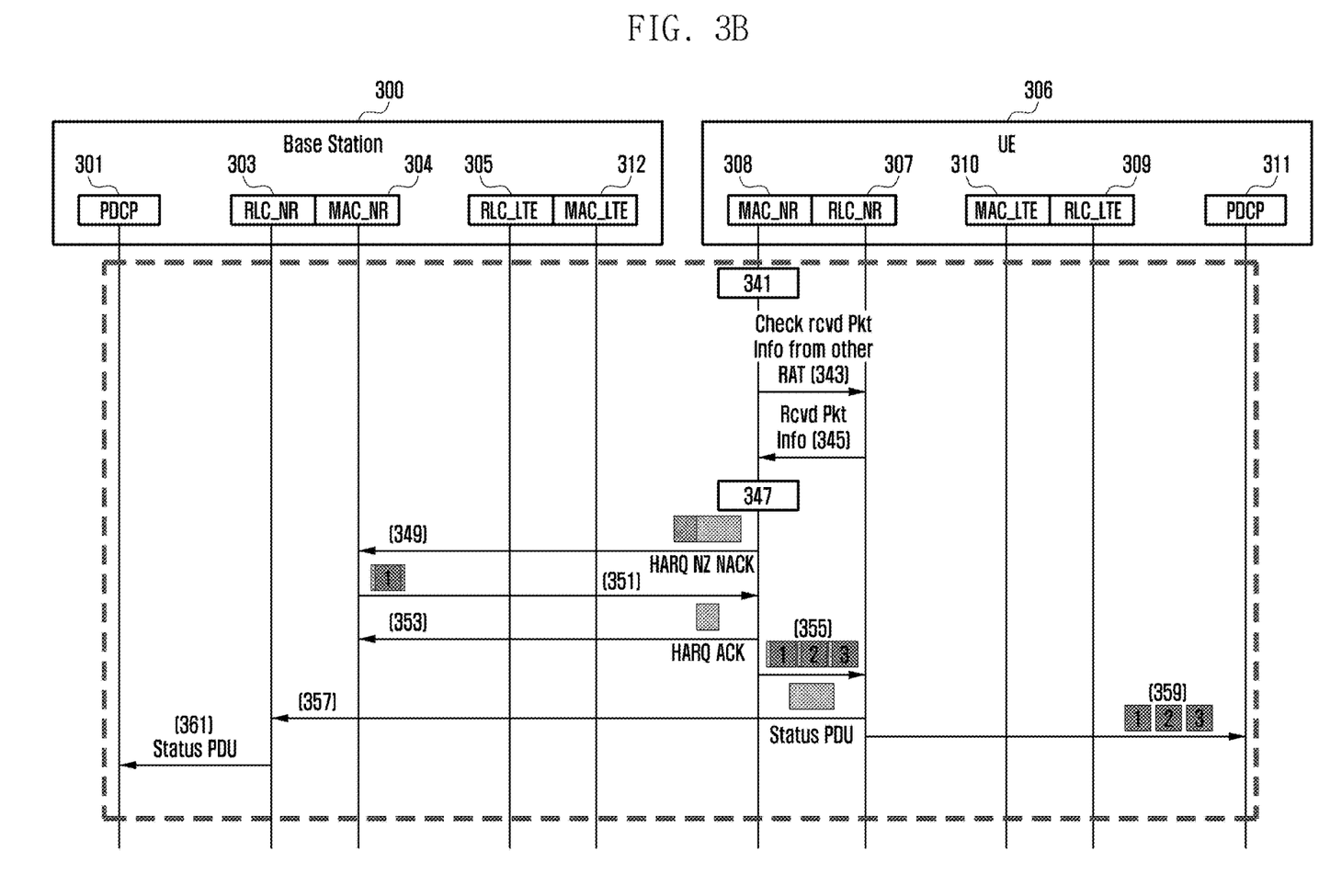
FIG. 3B illustrates a timing diagram in which UE internally informs received packet information to RLC and Medium Access Control (MAC) layers of NR according to an embodiment.

FIGS. 3A and 3B illustrate a timing diagram in which UE internally informs received packet information to RLC and MAC layers of NR according to an embodiment.

FIGS. 3A and 3B show PDCP 301, Radio Link Control Near Radio (RLC_NR) 303, Medium Access Control_Near Radio (MAC_NR) 304, Radio Link Control_Long-Term Evolution (RLC_LTE) 305 and Medium Access Control_Long-Term Evolution (MAC_LTE) 312 of a base station 300. Similarly, the UE 306 includes PDCP 311, RLC_NR 307, MAC_NR 308, RLC_LTE 309 and MAC_LTE 310. The RLC_NR 303, MAC_NR 304, RLC_NR 307, and MAC_NR 308 may be included in RAT using a 5G NR communication standard, e.g., a first RAT. The RLC_LTE 305, MAC_LTE 312, RLC_LTE 309, and MAC_LTE 310 may be included in RAT using an LTE communication standard, e.g., a second RAT.

In an embodiment, at PDCP 301 of base station, PDCP duplication and split bearer duplication features may be activated at operation 313. The DL data may be sent from the PDCP 301 to RLC_NR 303 at operation 315 and to RLC_LTE 305 of the base station at operation 321. The operations 315 and 321 may happen in parallel or in sequence one after the other. The DL data may, also, be referred as DL packets. The DL data from the RLC_NR 303 may be sent to MAC_NR 304 of the base station at operation 317.

Analogously, the DL data from the RLC_LTE 305 may be sent to MAC_LTE 312 of the base station at operation 323. The DL data may be sent from the base station to UE, i.e., to MAC_NR 308 at operation 319 and to the MAC_LTE 310 of the UE at operation 325. In an embodiment, the DL data may be a plurality of data packets. At this point, on receiving the DL data, the MAC_LTE 310 may send first ACK signal, i.e., HARQ ACK to the MAC_LTE 312 at operation 327. This first ACK signal may indicate that the DL data is successfully received by the MAC_LTE 310 of the UE. At operation 329, the MAC_LTE 310 may send the DL data to the RLC_LTE 309. The UE or the RLC_LTE 309 of the UE may update a PDCP sequence number of the DL data in a sequence number to CBG mapping table when the RLC_LTE 309 of the UE receives the DL data.

The PDCP sequence number may be referred as Mapping Table Sequence Number. The PDCP sequence number to CBG mapping table may be maintained by the RLC_LTE 309 and the RLC_NR 307 within the UE. In an embodiment, the Mapping Table may reside in the network, i.e., at a base station. The PDCP sequence number to CBG mapping table may be referred as Mapping Table. This table may be used to find whether the data has been received at the other RAT when there is an error in the received data at the current RAT. At operation 331, the DL data may be sent to PDCP 311 of the UE. At operation 333, the PDCP 311 of the UE may send the received DL data information (or in other words, received packet information) to the RLC_LTE 309 and subsequently, to the RLC_NR 307 at operation 335. The RLC_NR 307 may further inform the MAC_NR 308 about the received DL data information. At this point, the MAC_NR 308 may update "ACK received flag from other RAT" to TRUE. At operation 337, RLC_LTE 309 may send status of PDU to the RLC_LTE 305 of the base station, which may be further sent to the PDCP 301 of the base station at operation 339. The PDCP 301 of the base station may send PDU discard message to RLC_NR 303 of the base station on receipt of the status of PDU. The above-mentioned operations may be performed when the MAC_NR 308 of the UE successfully decoded the received the DL data.

With reference to FIG. 3B, when the MAC_NR 308 of the UE is not successful to decode the received DL data or finds error in the received DL data at operation 341, the MAC_NR 308 may ask the RLC_NR 307 to send the received DL data information from the RLC_LTE 309, i.e., other RAT at operation 343. The RLC_NR 307 may use the sequence number to CBG mapping table to check the received DL information that has been received successfully at the RLC_LTE 309, i.e., other RAT and may send the received DL data information in the Rcvd Pkt Info message to the MAC_NR 308 at operation 345. On checking the DL data information, the MAC_NR 308 may send a second ACK signal to the base station, i.e., HARQ ACK when the PDCP sequence number of the DL data is found in the sequence number to CBG mapping table. In an embodiment, when the UE detects an error in receiving the data packets on the first RAT, the UE may check whether at least one data packet has been received into a second RAT, and may send a message on the first RAT indicating that the plurality of data packets has been received if at least one data packet has been received on the second RAT. Here, the checking may be done by the UE by analyzing a Mapping Table maintained at the UE which is updated with a Mapping Table Sequence Number of the data packets successfully received by at least one RAT. However, on checking the DL data information, if the PDCP sequence number of the DL data is not found in the sequence number to CBG mapping table, then the MAC_NR 308 may send HARQ NACK signal for the non-received DL data at operation 347.

At operation 349, the MAC_NR 304 of the base station may receive HARQ NACK signal from the MAC_NR 308 of the UE. At operation 351, the MAC_NR 308 may receive the non-received DL data from the MAC NR 304 of the base station. In an embodiment, only a part of the DL data may be received by the RAT of the UE instead of complete DL data from the base station when the NACK signal is received by the base station. In return, at operation 353, the MAC_NR 308 of the UE may send a third ACK signal, i.e., HARQ ACK signal to acknowledge the receipt of the DL data. Subsequently, the complete DL data may be sent to the RLC_NR 307 of the UE at operation 355 and to the PDCP of the UE at operation 359. At operation 357, the RLC_NR 307 may send the status of PDU to the RLC_NR 303 of the base station, which may be further sent to the PDCP 301 of the base station at operation 361. The PDCP 301 of the base station may send PDU discard message to RLC_NR 303 of the base station on receipt of the status of PDU. The above-mentioned operations may be performed when the MAC_NR 308 of the UE did not successfully decode the received the DL data.

In an embodiment, the first RAT may be at least one of 2 Generation (G), 3G, 4G, 5G, 6G, and non-$3^{rd}$ Generation Partnership Project (3GPP) network and the second RAT may be at least one of 2G, 3G, 4G, 5G, 6G, and non-3GPP network.

The technical advantage of above embodiment is that this approach reduces the number of HARQ retransmission for the received data or packets if the data or packets have already been received from other RAT. Consequently, this results in reduction of resource consumption and battery consumption (for the UE).

Figure 4A:
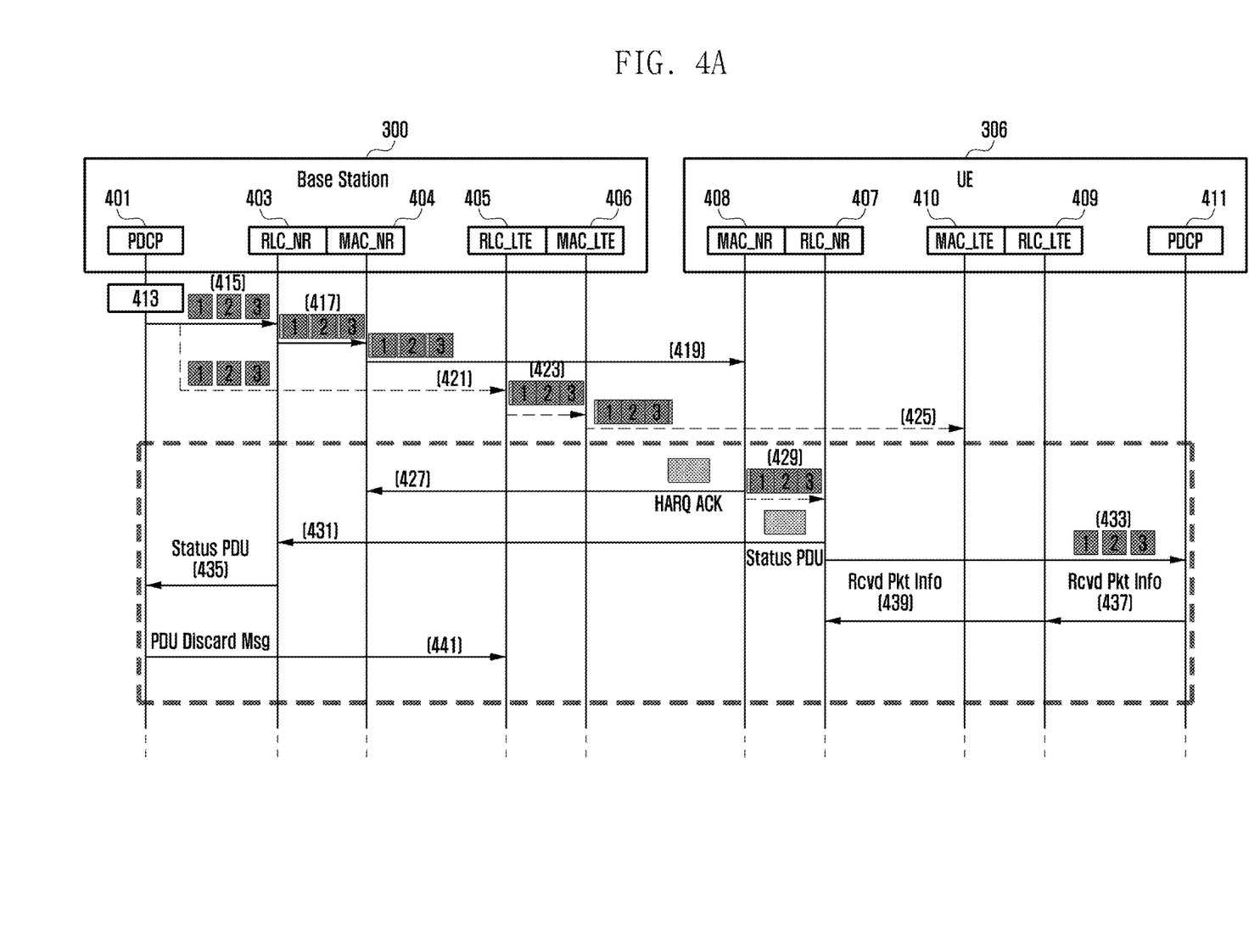
FIG. 4A illustrates a timing diagram in which UE internally informs received packet information to RLC and MAC layers of Long-Term Evolution (LTE) according to an embodiment.
Figure 4B:
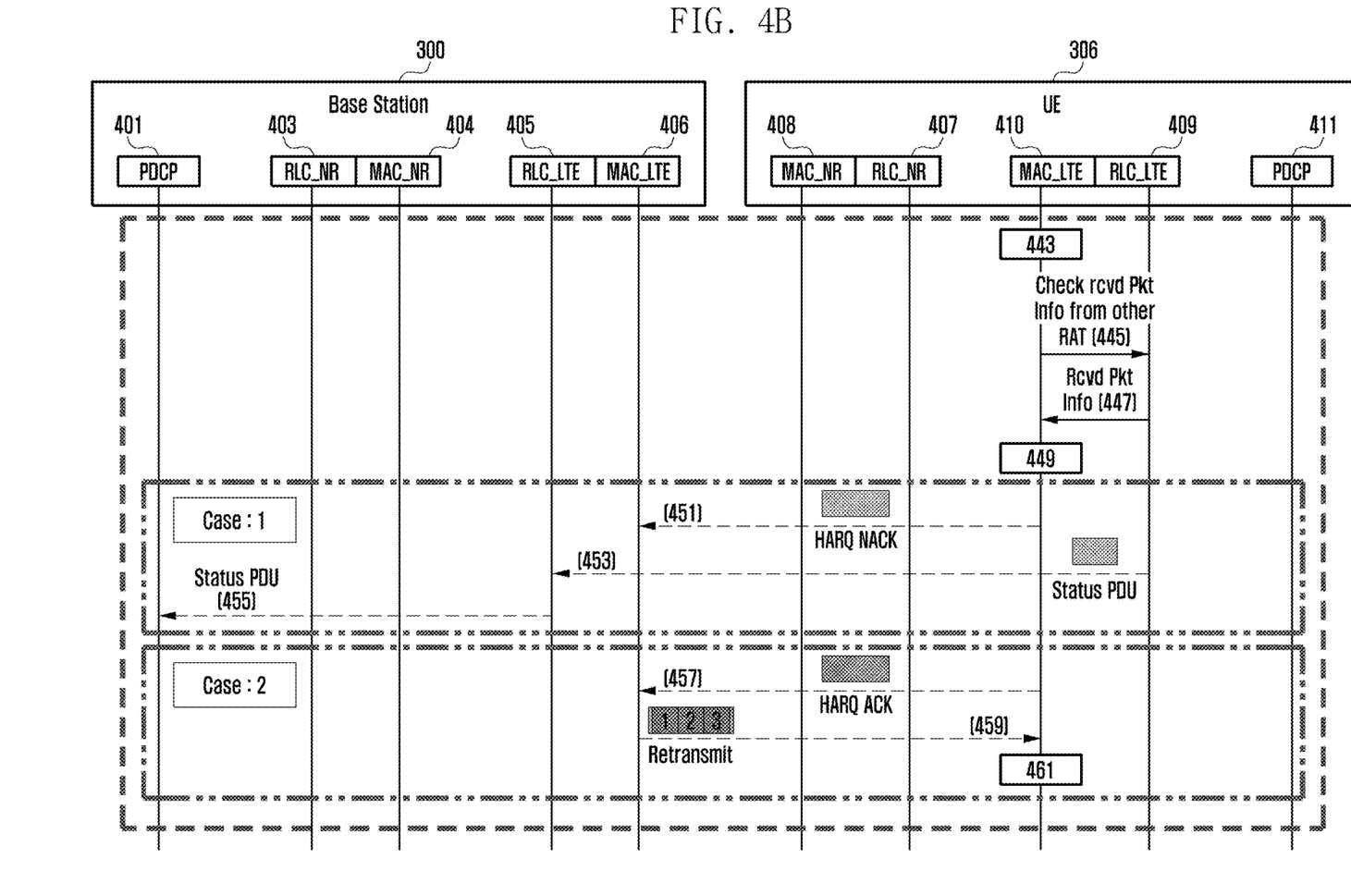
FIG. 4B illustrates a timing diagram in which UE internally informs received packet information to RLC and MAC layers of Long-Term Evolution (LTE) according to an embodiment.

FIGS. 4A and 4B illustrate a timing diagram in which UE internally informs received packet information to RLC and MAC layers of LTE according to an embodiment.

FIGS. 4A and 4B show PDCP 401, RLC_NR 403, MAC_NR 404, RLC_LTE 405 and MAC_LTE 406 of a base station 300. Similarly, the UE includes PDCP 411, RLC_NR 407, MAC_NR 408, RLC_LTE 409, and MAC_LTE 410. The RLC_NR 403, MAC_NR 404, RLC_NR 407, and MAC_NR 408 may be included in RAT using a 5G NR communication standard, e.g., a first RAT. The RLC_LTE 405, MAC_LTE 406, RLC_LTE 409, and MAC_LTE 410 may be included in RAT using an LTE communication standard, e.g., a second RAT.

In an embodiment, at PDCP 401 of base station, PDCP duplication and split bearer duplication features may be activated at operation 413. The DL data may be sent from the PDCP 401 to RLC_NR 403 at operation 415 and to RLC_LTE 405 of the base station at operation 421. The operations 415 and 421 may happen in parallel or in sequence one after the other. The DL data may, also, be referred as DL packets. The DL data from the RLC_NR 403 may be sent to MAC_NR 404 of the base station at operation 417. Analogously, the DL data from the RLC_LTE 405 may be sent to MAC_LTE 406 of the base station at operation 423. The DL data may be sent from the base station to UE, i.e., to MAC_NR 408 at operation 419 and to the MAC_LTE 410 of the UE at operation 425. In an embodiment, the DL data may be a plurality of data packets. At this point, on receiving the DL data, the MAC_NR 408 may send first ACK signal, i.e., HARQ ACK to the MAC_NR 404 at operation 427. This first ACK signal may indicate that the DL data is successfully received by the MAC_NR 408 of the UE. At operation 429, the MAC_NR 408 may send the DL data to the RLC_NR 407. The UE or the RLC_NR 407 of the UE may update a PDCP sequence number of the DL data in a sequence number to CBG mapping table when the RLC_NR 407 of the UE receives the DL data. The PDCP sequence number may be referred as Mapping Table Sequence Number. The PDCP sequence number to CBG mapping table may be maintained by the RLC_NR 407 and the RLC_LTE 409 within the UE. The PDCP sequence number to CBG mapping table may be referred as Mapping Table. This table may be used to find whether the data has been received at the other RAT when there is an error in the received data at the current RAT. In an embodiment, the Mapping Table may reside in the network, i.e., at a base station. At operation 431, the RLC_NR 407 may send status of PDU to the RLC_NR 403 of the base station, which may be further sent to the PDCP 401 of the base station at operation 435.

In operation 441, the PDCP 401 of the base station may send PDU discard message to RLC_LTE 405 of the base station on receipt of the status of PDU. At operation 433, the DL data may be sent to PDCP 411 of the UE by the RLC_NR 407. At operation 437, the PDCP 411 of the UE may send the received DL data information (or in other words, received packet information) to the RLC_LTE 409 and subsequently at operation 439, to the RLC_NR 407. The RLC_LTE 409 may further inform the MAC_LTE 410 about the received DL data information. At this point, the MAC_LTE 410 may update "ACK received flag from other RAT" to TRUE. The above-mentioned operations may be performed when the MAC_LTE 410 of the UE successfully decoded the received the DL data.

With reference to FIG. 4B, when the MAC LTE 410 of the UE is not successful to decode the received DL data or finds error in the received DL data at operation 443, the MAC_LTE 410 may ask the RLC_LTE 409 to send the received DL data information from the RLC_NR 407, i.e., other RAT at operation 445. The RLC_LTE 409 may use the sequence number to CBG mapping table to check the received DL information that has been received successfully at the RLC_NR 407, i.e., other RAT and may send the received DL data information in the Rcvd Pkt Info message to the MAC_LTE 410 at operation 447. On checking the DL data information at operation 449, the MAC_LTE 410 may send a second ACK signal to the base station, i.e., HARQ ACK at operation 451 when the PDCP sequence number of the DL data is found in the sequence number to CBG mapping table. Furthermore, at operation 453, the RLC_LTE 409 may send status of PDU to the RLC_LTE 405 of the base station, which may be further sent to the PDCP 401 of the base station at operation 455.

In an embodiment, when the UE detects an error in receiving the data packets on the first RAT, the UE may check whether at least one data packet has been received into a second RAT, and may send a message on the first RAT indicating that the plurality of data packets has been received if at least one data packet has been received on the second RAT. Here, the checking may be done by the UE by analyzing a Mapping Table maintained at the UE which is updated with a Mapping Table Sequence Number of the data packets successfully received by at least one RAT. However, on checking the DL data information, if the PDCP sequence number of the DL data is not found in the sequence number to CBG mapping table, then the MAC_LTE 410 may send HARQ NACK signal for the DL data to the MAC_LTE 406 of the base station at operation 457. At operation 459, the MAC_LTE 410 may receive the complete DL data from the MAC_LTE 406 of the base station. In an embodiment, complete DL data may be received by the RAT of the UE instead of only a part of DL data from the base station when the NACK signal is received by the base station. In return, the MAC_LTE 410 of the UE may send a third ACK signal, i.e., HARQ ACK signal to acknowledge the receipt of the DL data. At operation 461, the MAC_LTE 410 may perform error check on the received complete DL data as mentioned in operation 443 and may repeat the operations mentioned above in case of an error in DL data. The above-mentioned operations may be performed when the MAC_LTE 410 of the UE did not successfully decode the received the DL data.

In an embodiment, the first RAT may be at least one of 2 Generation (G), 3G, 4G, 5G, 6G, and non-3$^{rd}$ Generation Partnership Project (3GPP) network and the second RAT may be at least one of 2G, 3G, 4G, 5G, 6G, and non-3GPP network.

The technical advantage of above embodiment is that this approach, also, reduces the number of HARQ retransmission for the received data or packets if the data or packets have already been received from other RAT. Consequently, this results in reduction of resource consumption and battery consumption (for the UE).

Figure 5A:
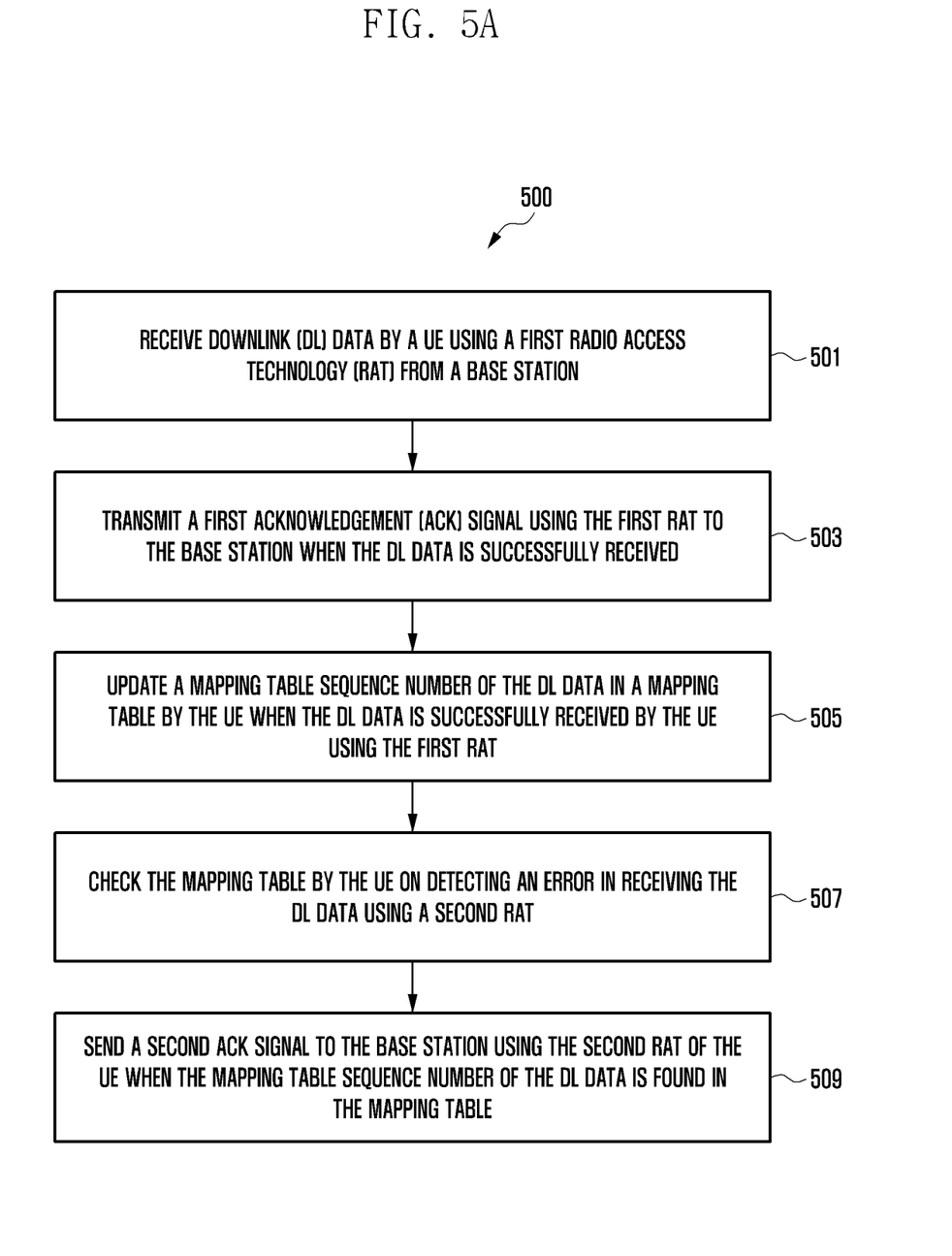
FIG. 5A illustrates a flowchart showing a method for optimizing radio resource for URLLC services in a DC technology according to an embodiment.
Figure 5B:
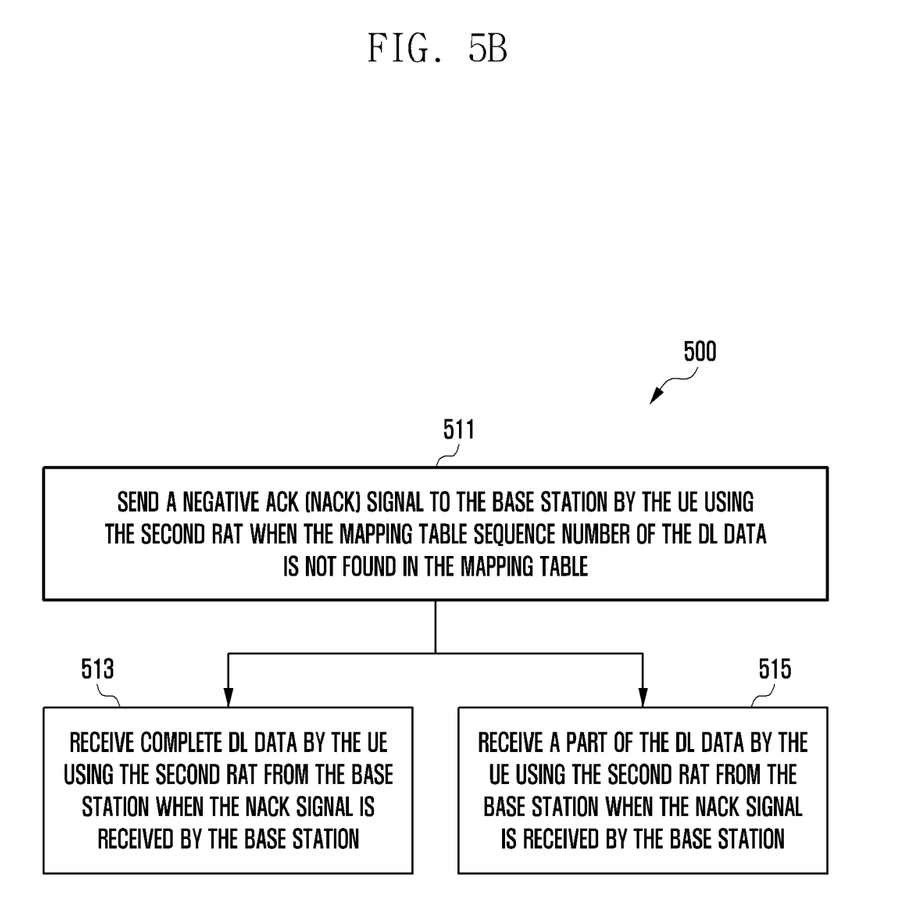
FIG. 5B illustrates a flowchart showing a method for optimizing radio resource for URLLC services in a DC technology according to an embodiment.

FIGS. 5A and 5B illustrate a flowchart showing a method for optimizing radio resource for URLLC services in a DC technology according to an embodiment.

As illustrated in FIGS. 5A and 5B, the method 500 includes one or more operations for optimizing radio resource for URLLC services in a DC technology. The method 500 may be described in the general context of computer executable instructions. Generally, computer executable instructions can include routines, programs, objects, components, data structures, procedures, units, and functions, which perform particular functions or implement particular abstract data types.

The order in which the method 500 is described is not intended to be construed as a limitation, and any number of the described method operations can be combined in any order to implement the method. Additionally, individual operations may be deleted from the methods without departing from the scope of the subject matter described herein. Furthermore, the method can be implemented in any suitable hardware, software, firmware, or combination thereof At operation 501, a UE may receive DL data by using a first RAT from a base station.

At operation 503, the UE may transmit a first ACK signal using the first RAT to the base station. This transmission may be performed when the DL data is successfully received by the first RAT of the UE.

At operation 505, the UE may update a Mapping Table Sequence Number of the DL data in a Mapping Table. This updating may be performed when the DL data is received at PDCP layer of the UE using the first RAT.

At operation 507, the UE may check the Mapping Table on detecting an error in receiving the DL data using a second RAT.

At operation 509, the UE may send a second ACK signal to the base station using the second RAT of the UE. This operation may be performed when the Mapping Table Sequence Number of the DL data is found in the Mapping Table.

The first RAT and the second RAT may be at least one of a 2G, 3G, 4G, 5G, 6G, and non-3GPP network communication standard. Furthermore, the first RAT may be different from the second RAT or may be same as the second RAT. PDCP duplication and split bearer duplication feature may be enabled to receive the DL data in CBG format by the UE.

FIG. 5B illustrates a flowchart showing a method for receiving complete or a part of DL data when the Mapping Table Sequence Number of the DL data is not found in the Mapping Table according to an embodiment.

At operation 511, the UE may send a NACK signal to the base station using the second RAT. This operation may be performed when the Mapping Table Sequence Number of the DL data is not found in the Mapping Table.

At operation 513, the UE using the second RAT may receive complete DL data from the base station when the NACK signal is received by the base station.

At operation 515, the UE using the second RAT may receive a part of the DL data from the base station when the NACK signal is received by the base station.

The operation 513 or the operation 515 may be performed while the UE receives DL data. This may depend on RAT communication standard. For instance, if the RAT receiving DL data is of an LTE communication standard, then the RAT may receive complete DL data from the base station when the NACK signal is received by the base station. However, if the RAT receiving DL data is of a 5G NR communication standard, then the RAT may receive a part of the DL data from the base station when the NACK signal is received by the base station.

The present disclosure is applicable in Multi RAT Dual Connectivity (MR-DC) and New Radio-New Radio (NR-NR) DC scenarios. Furthermore, the present disclosure might not be limited to LTE communication standard and 5G NR communication standard as discussed here but may be extended to any future communication standards. In addition, though the description describes a Dual RAT operation, the invention is not limited to dual RAT and would work as disclosed for multiple RATs as well.

Some of the advantages of the present disclosure are mentioned below.

The present disclosure by reducing the number of HARQ retransmission for the received data or packets reduces resource consumption making it beneficial for delay sensitive applications of fifth generation wireless network when PDCP and split bearer is applied.

The present disclosure reduces resource consumption, thereby, saving radio resources that may be utilized by other UEs.

The present disclosure increases spectral efficiency as well as spectral reuse of cellular network due to the reduction in the number of HARQ retransmissions.

With the advantages mentioned above, URLLC applications such as factory automation, remote motion control, smart grids and self-driving cars and the like bound to get benefited.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself The illustrated operations of FIGS. 5A and 5B show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it has not been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for optimizing radio resource for Ultra-Reliable Low Latency Communication services in a Dual Connectivity technology, the method comprising:
   receiving DownLink (DL) data by a user equipment (UE) apparatus using a first Radio Access Technology (RAT) from a base station;
   transmitting a first Acknowledgement (ACK) signal using the first RAT to the base station based on the DL data being successfully received;
   updating a Mapping Table Sequence Number of the DL data in a Mapping Table by the UE apparatus, based on the DL data being successfully received by the UE apparatus using the first RAT;
   checking the Mapping Table by the UE apparatus upon detecting an error in the received DL data using a second RAT; and
   sending a second ACK signal to the base station using the second RAT of the UE apparatus, based on the Mapping Table Sequence Number of the DL data being found in the Mapping Table.

2. The method as claimed in claim 1, wherein Packet Data Convergence Protocol (PDCP) duplication and split bearer duplication feature is enabled to receive the DL data in one from among a Code Block Group format and a Transport Block format, by the UE apparatus.

3. The method as claimed in claim 1, wherein the first RAT is a network comprising at least one from among a 2G, a 3G, a 4G, a 5G, a 6G, and a non-3GPP,
   the second RAT is a network comprising at least one from among a 2G, a 3G, a 4G, a 5G, a 6G, and a non-3GPP, and
   the first RAT and the second RAT are same or different.

4. The method as claimed in claim 1, further comprising:
   sending a Negative ACK (NACK) signal to the base station by the UE apparatus using the second RAT based on the Mapping Table Sequence Number of the DL data not being found in the Mapping Table.

5. The method as claimed in claim 4, further comprising:
   receiving complete DL data by the UE apparatus using the second RAT from the base station, based on receiving the NACK signal by the base station.

6. The method as claimed in claim 4, further comprising:
   receiving a part of the DL data by the UE apparatus using the second RAT from the base station, based on receiving the NACK signal by the base station.

7. The method as claimed in claim 1, wherein each of the first RAT and the second RAT comprises:
   a first Medium Access Control (MAC) layer and a first Radio Link Control (RLC) layer that are specified to work using a Long-Term Evolution communication standard,
   a second MAC layer and a second RLC layer that are specified to work using a 5G New Radio communication standard, and
   the first RAT and the second RAT are same or different.

8. The method as claimed in claim 1, wherein the Mapping Table comprises a mapping between a Code Block Group (CBG) and a Packet Data Convergence Protocol (PDCP) sequence number, between a Transport Block (TB) and the PDCP sequence number, between a PDCP and the PDCP sequence number, between the CBG and a CBG sequence number, or between the TB and a TB sequence number.

9. The method as claimed in claim 1, wherein the Mapping Table resides at a Medium Access Control layer, a Radio Link Control layer, or a Packet Data Convergence Protocol layer, of the UE apparatus.

10. A user equipment (UE) apparatus for optimizing radio resource for Ultra-Reliable Low Latency Communication services in a Dual Connectivity technology, the UE apparatus comprising:
a processor; and
a memory communicatively coupled to the processor and configured to store one or more processor-executable instructions which, when executed by the processor, cause the processor to:
receive DownLink (DL) data using a first Radio Access Technology (RAT) from a base station,
transmit a first Acknowledgement (ACK) signal using the first RAT to the base station based on the DL data being successfully received,
update a Mapping Table Sequence Number of the DL data in a Mapping Table based on the DL data being successfully received using the first RAT,
check the Mapping Table upon detecting an error in the received DL data using a second RAT, and
send a second ACK signal to the base station using the second RAT based on the Mapping Table Sequence Number of the DL data being found in the Mapping Table.

11. The UE apparatus as claimed in claim 10, wherein Packet Data Convergence Protocol duplication and split bearer duplication feature is enabled to receive the DL data in one from among a Code Block Group format and a Transport Block format, by the UE apparatus.

12. The UE apparatus as claimed in claim 10, wherein the first RAT is a network comprising at least one from among a 2G, a 3G, a 4G, a 5G, a 6G, and a non-3GPP,
the second RAT is a network comprising at least one from among a 2G, a 3G, a 4G, a 5G, a 6G, and a non-3GPP, and
the first RAT and the second RAT are same or different.

13. The UE apparatus as claimed in claim 10, wherein the one or more processor-executable instructions executed by the processor further cause the processor to:
send a Negative ACK (NACK) signal to the base station using the second RAT based on the Mapping Table Sequence Number of the DL data not being found in the Mapping Table.

14. The UE apparatus as claimed in claim 13, wherein the one or more processor-executable instructions executed by the processor further cause the processor to:
receive complete DL data using the second RAT from the base station based on receiving the NACK signal by the base station.

15. The UE apparatus as claimed in claim 13, wherein the one or more processor-executable instructions executed by the processor further cause the processor to:
receiving a part of the DL data using the second RAT from the base station based on receiving the NACK signal by the base station.

16. The UE apparatus as claimed in claim 10, wherein each of the first RAT and the second RAT comprises:
a first Medium Access Control (MAC) layer and a second Radio Link Control (RLC) layer that are specified to work using a Long-Term Evolution communication standard,
a second MAC layer and a second RLC layer that are specified to work using a 5G New Radio communication standard, and
the first RAT and the second RAT are same or different.

17. The UE apparatus as claimed in claim 10, wherein the Mapping Table comprises a mapping between a Code Block Group (CBG) and a Packet Data Convergence Protocol (PDCP) sequence number, between a Transport Block (TB) and the PDCP sequence number, between a PDCP and the PDCP sequence number, between the CBG and a CBG sequence number, or between the TB and a TB sequence number.

18. The UE apparatus as claimed in claim 10, wherein the Mapping Table resides at a Medium Access Control layer, a Radio Link Control layer, or a Packet Data Convergence Protocol layer, of the UE apparatus.

* * * * *